Apr. 17, 1923.

H. GÜTLIN 1,452,239

METHOD FOR UTILIZING SOLID FUEL

Filed Feb. 20, 1922

INVENTOR
H. Gütlin
BY Lawrence Langner
ATTORNEY

Patented Apr. 17, 1923.

1,452,239

UNITED STATES PATENT OFFICE.

HERMANN GÜTLIN, OF BASEL, SWITZERLAND, ASSIGNOR TO ELEKTRIZITATSWERK LONZA, OF GAMPEL, SWITZERLAND, A CORPORATION OF SWITZERLAND.

METHOD FOR UTILIZING SOLID FUEL.

Application filed February 20, 1922. Serial No. 538,055.

*To all whom it may concern:*

Be it known that I, HERMANN GÜTLIN, a citizen of the Swiss Republic, and a resident of Basel, Switzerland, have invented a certain new and useful Method for Utilizing Solid Fuel, of which the following is a full, clear, and exact specification.

Heretofore it has been common for domestic purposes to supply the heat necessary for the purpose of heating or cooking the contents of ordinary household containers by a so called solid fuel supported beneath the container and held in a receptacle of its own; the solid fuel being bulky and intended for heating a plurality of containers.

My present invention involves the novel idea of a solid combustible ration intended for heating an individual container to which it may be attached by suitable means. I have embodied this idea in a solid ration which burns without ash, which is adapted by its form to be conveniently attached to the ordinary household receptacle and which when ignited while so attached will remain attached and apply its heat efficiently.

A further object of the invention is to provide means for utlizing a fuel unit of such general character.

In the embodiment of the invention herein described, I employ metaldehyde as the material for the fuel unit, inasmuch as a metaldehyde fuel body brought to a coherent condition as by pressure, possesses all of the desired qualities enumerated above, and I have discovered that the said body is capable of receiving an adhesive by means of which it may be affixed to a vessel. I have also discovered that a coherent mass of said metaldehyde may be attached or affixed to the article to be heated, may be ignited on said article, and will heat said article with a maximum utilization of the heat generated in the fuel. The tablets of metaldehyde burn with a steady and uniform flame comparatively gradually without melting, without forming an ash, and without odor. After extinction of the flame, the mass cools very quickly. It is sufficiently stable and self sustaining physically and chemically for ordinary household handling, without the necessity of employing an air-tight container therefor. The formation of a soilid fuel from metaldehyde and the nature of the substance is fully described in the pending application filed March 22, 1920, Serial No. 367,701, Patent 1,407,101, Feb. 21, 1922.

Metaldehyde is produced as a by-product in the manufacture of paraldehyde when the conversion process (treatment with a little acid) is performed in the cold. Unlike the formaldehyde derivatives, metaldehyde is insoluble in water and has a very low vapor tension. It is, therefore, highly durable, easily transported and preserved, and also odorless.

For use as a fuel metaldehyde, which is usually produced in a finely crystalline, highly voluminous form, I bring to a coherent condition, for instance, by pressure. When the crystals are compressed, cakes, blocks or other aggregates are produced, which burn with a steady and uniform flame comparatively gradually, without leaving a residue. By employing very high pressures—for instance, pressures of several hundred atmospheres—such a cohesion of the crystals takes place that the resulting cakes, blocks, etc. are hard enough to be readily handled and are nearly odorless. The pressure productive of this condition should not be exceeded lest decomposition into paraldehyde be produced, indicated by increasing odor of the latter and decrease in stability. The pressure used to form the blocks has been found to be approximately seven hundred (700) atmospheres for an instant.

The invention will be understood by reference to the drawing, in which—

Figure 1:
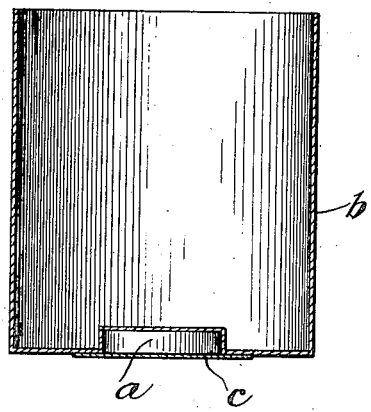
Fig. 1 is a sectional elevation of a vessel, formed with a chamber in which is received a solid fuel tablet.

In the utilization of the solid fuel material as shown in Fig. 1, the material $a$, in tablet form, is disposed within a chamber formed in the bottom of a vessel $b$, wherein it may be held by an adhesive, as for example, starch glue. As an alternative, the material may be pressed into the chamber in the form of a coherent mass so as to be held therein by the cohesion of its particles and frictional contact with the walls of the chamber. A protecting seal c of any suitable material such as paper may be employed to cover the tablet.

Figure 2:
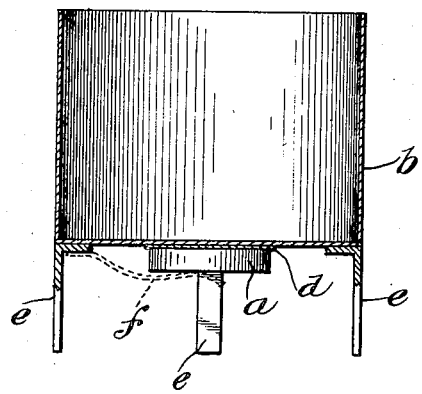
Fig. 2 is a sectional elevation of a vessel, showing a fuel tablet affixed thereto by an adhesive.

In Fig. 2, the tablet a is affixed to the bottom of a vessel b, by an adhesive member d, the vessel being supported upon legs e. As an alternative, the adhesive member may be dispensed with and a spring finger f, shown in dotted lines, may be employed to hold the tablet in position. In the drawing the finger is shown attached to one of the legs e, although it may be preferable in some cases to attach the finger directly to the vessel. It will be understood that as the tablet decreases in thickness by its consumption, the finger will move inwardly and act to support the tablet until it is entirely consumed.

The fuel material may be formed into a variety of shapes in accordance with various needs. When rapid heating is desired, the material may be ring-shaped as in Fig. 3, so that the heated surface extends both inside and outside of the annulus, or the fuel material may be formed as a wafer as in Fig. 4, and thus adapted to distribute its heat over a large expanse of surface, the period of its combustion relative to its bulk thus being less than when formed as a thick tablet.

Figure 5:
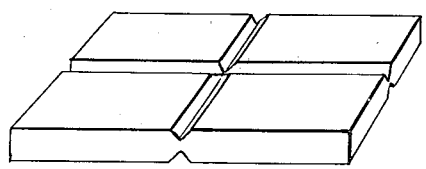
Fig. 5 illustrates in perspective view a plurality of tablet rations in the form of a cake.

In Fig. 5, I have shown a plurality of tablet rations in the form of a cake made up of four tablets, each of which may be of such predetermined size as to raise to the boiling point say one pint of water in an ordinary utensil; if a quart of water is contained in said utensil, the cake is divided in two, and two of the tablets are attached to the utensil.

Figure 4:
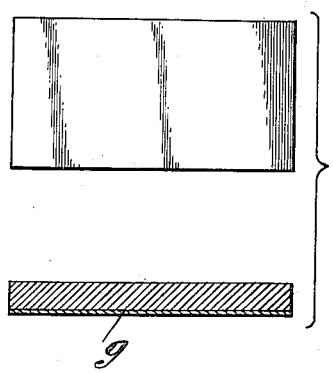

I may, in place of employing the adhesive member d, shown in Fig. 2 use a coating of adhesive at the bottom of the fuel tablet, as shown at g in Fig. 4. The fuel tablet can thus be marketed with the adhesive attached thereto, so that the person using the tablet has only to moisten the adhesive and thereby quickly attach the tablet to the article to be heated. The tablets can be marketed in boxes which need not be air-tight, and they may be made in different sizes and shapes to correspond with the different sizes and shapes of the article which they are to heat.

The utilization of the fuel material as shown in Figs. 1 and 2 of the drawing is of particular value in the case of canned foodstuffs and the like which are commonly heated before removal from the can, inasmuch as the fuel tablet affixed to the individual can may be gauged in size proportionately to the required degree and period of heat and may be sold as a unit with the canned material.

When the fuel is affixed to the vessel by adhesion, as hereinbefore described, it will burn completely without falling off the surface of the vessel, and the heating power is considerably greater than that obtained when the fuel is placed the usual distance beneath the vessel. The same result is obtained when the fuel is held affixed to the vessel by mechanical means or by other suitable means.

Figure 3:
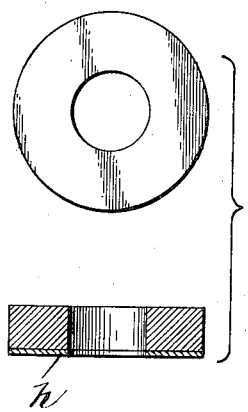
Figs. 3 and 4 illustrate in plan and in section two forms of the fuel material.

I may in some cases, in order to secure a very rapid ignition or initiation of combustion of the fuel tablet, provide one or both faces of the tablet with a coating of collodion as for example, the coating h shown in Fig. 3. This coating is very thin, in the shape of a film, and ignites rapidly when a match is applied to it, thereby causing the instantaneous combustion of the entire combustion surface of the tablet. When the collodion is coated on both sides of the tablet, the collodion on one side can serve as the adhesive material whereby the tablet is affixed to the object to be heated. It also acts as a protective coating.

While the fuel tablet as hereinbefore referred to, is made of metaldehyde, which is preferably used in a pure state, it will be understood that it may be employed in a binder, if desired, to secure the coherence of the metaldehyde, and that while the best results have been obtained by the use of metaldehyde, other substances might be mixed with the metaldehyde.

Having described the invention, what I claim and desire to secure by Letters Patent is—

1. The method of heating a body, consisting in attaching to said body, by means of an adhesive, a mass of solid fuel material, and igniting said mass.

2. The method of heating a body, which consists in attaching by an adhesive, a mass comprising metaldehyde, and igniting said mass.

3. The method of heating a body, consisting in attaching to said body, a mass comprising metaldehyde and igniting said mass.

4. The method of heating a body, which consists in attaching to the body a tablet comprising metaldehyde, the shape of said tablet being predetermined to the shape of the body.

5. The method of heating a vessel, consisting in attaching to the under side of the vessel a tablet comprising metaldehyde, supporting the vessel with an air space below the vessel, and igniting the tablet of metaldehyde within the said air space.

In witness whereof I have hereunto signed my name this 14th day of January, 1922, in the presence of two subscribing witnesses.

HERMANN GÜTLIN.

Witnesses:
FRIEDA KURR,
AMAND RITTEG.